(12) United States Patent
Fisson et al.

(10) Patent No.: US 7,514,112 B2
(45) Date of Patent: Apr. 7, 2009

(54) VACUUM KNEADING METHOD WITH THE INTRODUCTION OF OXYGEN AND THE DEVICE USED TO CARRY OUT SAID METHOD

(75) Inventors: Gérard Fisson, Saint-Hilaire de Laoulay (FR); Laurent Jaunet, Saint-Hilaire de Loulay (FR); Guillaume Vannier, Nantes (FR)

(73) Assignee: VMI, Montaigu (FR)

( * ) Notice: Subject to any disclaimer, the term of this patent is extended or adjusted under 35 U.S.C. 154(b) by 122 days.

(21) Appl. No.: 10/473,170

(22) PCT Filed: Oct. 16, 2002

(86) PCT No.: PCT/FR02/03542

§ 371 (c)(1),
(2), (4) Date: Sep. 29, 2003

(87) PCT Pub. No.: WO03/032736

PCT Pub. Date: Apr. 24, 2003

(65) Prior Publication Data

US 2004/0156968 A1    Aug. 12, 2004

(30) Foreign Application Priority Data

Oct. 19, 2001    (FR) ................................ 01 13521

(51) Int. Cl.
*A21D 2/00* (2006.01)
(52) U.S. Cl. ........................ 426/312; 426/498; 426/504; 426/519

(58) Field of Classification Search ................. 426/312, 426/496, 498, 504, 519
See application file for complete search history.

(56) References Cited

U.S. PATENT DOCUMENTS

| 19,610 | A | * | 3/1858 | Perry et al. | ................. 426/498 |
|---|---|---|---|---|---|
| 45,706 | A | * | 1/1865 | Fitzgerald | ................. 426/498 |
| 1,017,361 | A | * | 2/1912 | Adam | ................. 426/19 |
| 1,076,464 | A | * | 10/1913 | Stiriz | ................. 426/549 |
| 1,203,361 | A | * | 10/1916 | Kohman et al. | ............ 426/312 |

(Continued)

FOREIGN PATENT DOCUMENTS

DE      7330262      3/1976

(Continued)

*Primary Examiner*—Drew E. Becker
(74) *Attorney, Agent, or Firm*—Blank Rome LLP (57) ABSTRACT

The invention relates to a method of kneading dough in order to produce bread or similar products. According to the invention, the dough ingredients are introduced into a chamber and all of said ingredients are subsequently kneaded. The inventive method is characterised in that it comprises: a vacuum phase during which a vacuum is applied in the chamber; and one or more phases involving the introduction of gas, during which a gas containing oxygen is introduced into the chamber. The aforementioned vacuum phase continues more or less throughout the entire kneading phase, with at least one part of each introduction phase taking place simultaneously with the kneading phase. The invention also relates to a device that is used to carry out said method.

13 Claims, 4 Drawing Sheets

U.S. PATENT DOCUMENTS

| | | | | |
|---|---|---|---|---|
| 2,791,405 A * | 5/1957 | Liston | ............... | 366/77 |
| 4,326,384 A * | 4/1982 | Pipe et al. | ............... | 62/62 |
| 4,369,193 A * | 1/1983 | Collins et al. | ............... | 426/19 |
| 4,465,700 A * | 8/1984 | Ball | ............... | 426/504 |
| 4,661,364 A * | 4/1987 | Campbell | ............... | 426/496 |
| 5,089,283 A * | 2/1992 | Wilson | ............... | 426/498 |
| 5,283,074 A * | 2/1994 | Campbell | ............... | 426/496 |
| 6,338,867 B1 * | 1/2002 | Lihotzky-Vaupel | ............... | 426/557 |
| 6,399,120 B1 * | 6/2002 | Kambe et al. | ............... | 426/27 |
| 6,503,550 B1 * | 1/2003 | Suganuma et al. | ............... | 426/519 |
| 2006/0126427 A1 * | 6/2006 | Fisson et al. | ............... | 366/76.6 |

FOREIGN PATENT DOCUMENTS

| | | | |
|---|---|---|---|
| EP | 246768 A1 | * | 11/1987 |
| EP | 0 246 768 B1 | | 9/1992 |
| EP | 629115 B1 | * | 12/1994 |
| FR | 2 515 001 | | 10/1981 |
| FR | 2515001 A | * | 4/1983 |
| GB | 318851 | | 9/1929 |
| GB | 2 264 623 | | 9/1993 |
| JP | 59213373 A | * | 12/1984 |
| JP | 1-309633 | | 12/1989 |
| JP | 09154496 A | * | 1/1997 |
| JP | 9-154496 | | 6/1997 |
| JP | 09154496 A | * | 6/1997 |

* cited by examiner

VACUUM KNEADING METHOD WITH THE INTRODUCTION OF OXYGEN AND THE DEVICE USED TO CARRY OUT SAID METHOD

CROSS-REFERENCE TO RELATED APPLICATIONS

This application is a National Phase Application of PCT/FR02/03542, which claims priority to French Patent Application No. 0113521, filed Oct. 19, 2001, entitled "Vacuum Kneading Method with the Introduction of Oxygen and the Device Used to Carry Out Said Method," both of which are incorporated by reference herein.

BACKGROUND OF THE INVENTION

The invention concerns a method of kneading dough for making bread or similar products and a device for implementing the said method.

The document EP-A-0 246 768 describes a method and apparatus for kneading bread dough in an oxygen-enriched atmosphere. To this end, oxygen or oxygen-enriched air is introduced into the chamber of the apparatus contained in the dough before or during kneading. The atmosphere in the chamber is then discharged through a discharge pipe. This addition of oxygen promotes the action of the ascorbic acid, used as a single improving product (known as an improver in the technical field).

This document describes that the application of a partial vacuum in the chamber is not necessary but that it can be implemented before the introduction of the oxygen or the oxygen-enriched air.

However, this method does not make it possible to control the development of the bubble structure in the bread dough.

According to the document EP-A-0 629 115, it is known that the production of a partial vacuum during kneading improves the uniformity of the structure of the soft part of the bread. However, the creation of a partial vacuum removes the air, which reduces the oxidation of the improvers used by bakers (ascorbic acid or potassium bromate) for intensifying the formation of the gluten lattice and, stabilising the structure of the bubbles.

The document EP-A-0 629 115 describes a dough kneading method for optimising the use of ascorbic acid as an improver. To this end, the method comprises the kneading of the dough ingredients in the presence of air or a gas containing oxygen. During a first phase of this kneading, an overpressure is applied to the atmosphere surrounding the dough, whilst a reduced pressure is applied during a second phase of the kneading. The first phase allows oxidation of the ascorbic acid, the second phase controlling the structure of the bubbles in the dough.

This method has the drawback of requiring two kneading phases, including one phase under air overpressure which is difficult to achieve with normal kneading means.

This is because high forces are exerted by the air pressure on the mixing chamber and on its mechanical environment such as for example the mixing tool or tools, the sealing joint or joints, and the lid of the vessel.

SUMMARY AND OBJECTS OF THE INVENTION

The invention aims to resolve the aforementioned drawbacks of the prior art by proposing a method affording adequate oxygenation of the dough at the same time as controlling the structure of the bubbles within it.

The method thus optimises the uniformity of the structure of the soft part of the bread whilst guaranteeing sufficient oxygenation thereof.

To this end, a first object of the invention is a method of kneading dough for making bread or similar products, in which the ingredients of the dough are introduced into a chamber, and then the said ingredients are kneaded together, characterised in that it comprises:

a negative-pressure phase during which a negative pressure is applied in the chamber (2);

a phase or several phases of introducing gas G during which a gas G containing oxygen is introduced into the chamber (2);

the negative-pressure phase lasting for substantially the entire duration of the kneading phase, at least part of each introduction phase being simultaneous with the kneading phase.

No overpressure with respect to atmospheric pressure is thus applied in the chamber, which avoids the application of stresses. In a variant, the negative-pressure phase begins just a little time before or after the start of the kneading phase and/or finishes just a little time before or after the end of the kneading phase.

In another variant, the gas introduction phase or phases begin just a little time before or after the start or end of the kneading phase, and/or finish just a little time before or after the start or end of the kneading phase.

In one embodiment, the method comprises a single phase of introducing the gas G which lasts substantially throughout the kneading phase.

In another embodiment, the method comprises several introduction phases, the intervals of time between these phases and the duration of each of these phases being variable.

Each introduction phase can last from a few seconds to several tens of minutes.

Moreover, during each introduction phase, it is possible to vary the flow rate of gas G.

And during the negative-pressure phase, it is possible to apply an absolute pressure in the chamber (2) of between 0.02 bar and 0.98 bar.

In a variant, the gas said (G) can be introduced into the chamber (2) in the volume of the dough (P).

A second object of the invention is a device implementing the method described above.

This device comprises a chamber formed by a vessel intended to contain the dough and a removable lid hermetically closing the said vessel, and kneading means comprising a rotor.

The said device is characterised in that it comprises gas supply means opening out in the chamber and pipes for discharging the atmosphere from the chamber opening out in the chamber at a distance from the dough.

In a variant, the said supply means and the said discharge pipes are disposed on substantially opposite parts of the chamber.

In one embodiment, the said discharge pipes are connected to at least one vacuum pump.

In another embodiment, the said feed means open out in the bottom part of the said chamber.

The gas then passes through the dough before being discharged, forming air bubbles therein. The dimensions of these air bubbles are very rapidly reduced by virtue of keeping the chamber under partial vacuum.

In a first embodiment of the device, the axis of the rotor of the said device is horizontal and the fixing and sealed guidance of the rotor with respect to the said vessel are achieved by means of two bearings, each bearing comprising in particular a bearing body comprising means of fixing to the vessel, and having a central recess or seat for the end part of the rotor to pass;

sealing means arranged for providing the dynamic sealing of the chamber;

a jacket in the form of a substantially cylindrical part of revolution, fitted on the said end part of the rotor and interposed between it and the bearing body, the sealing means being disposed between the seat of the bearing body and the jacket.

The means of supplying gas to the vessel are then situated at the means of sealing the said bearing.

This configuration makes it possible to use means already existing for the introduction of the gas.

In a variant, the said bearing sealing means comprise a plurality of lip joints fitted in a housing of the seat, the lips of the joints cooperating with a first end part of the jacket turned towards the vessel, at least one of the joints being oriented so that its lip is turned towards the vessel, whilst at least one of the other joints is oriented so that its lip is turned in the opposite direction.

In this variant, the gas supply means open out in the housing between the vessel and the said joint whose lip is turned towards the vessel.

In another variant, the said bearing sealing means comprise a plurality of lip joints fitted in a housing of the seat, the lips of the joint cooperating with a first end part of the jacket turned towards the vessel, two juxtaposed joints being oriented so that the lip is turned towards the vessel whilst at least one of the other joints is oriented so that its lip is turned in the opposite direction.

In this variant, the gas supply means open out in the housing between the said juxtaposed joints whose lip is turned towards the vessel.

The gas arriving under overpressure then raises the joint disposed between the supply means and the vessel. In addition, the passage of the gas between the two joints prevents the dough from being introduced into this space, guaranteeing the hygiene of the latter.

In a second embodiment of the device the axis of the rotor of the device is horizontal and the vessel is asymmetric with respect to a vertical plane P passing through the rotation axis of the rotor.

The vessel comprises a first substantially vertical side wall, and a second side wall inclined by a given angle to the vertical. The curved vessel bottom connects the first wall to the second side wall, so that the vessel comprises, on the side of the second side wall, a space widening out towards the top in the form of a crescent, situated between the second side wall and the path followed by the free end of the rotor blades.

In this embodiment, the gas supply means open out in the said space.

Thus the supply means open out outside the passage of the rotor blades and are easily accessible.

BRIEF DESCRIPTION OF THE DRAWINGS

Other objects and advantages of the invention will emerge during the following description of embodiments, with reference to the accompanying drawings, given by way of non-limiting examples, in which.

The X-axes of the diagrams depicted in FIGS. 6 to 8 coincide so as to be able to compare the durations of the various kneading, negative pressure and introduction phases of the method.

DETAILED DESCRIPTION OF THE INVENTION

Figure 1:
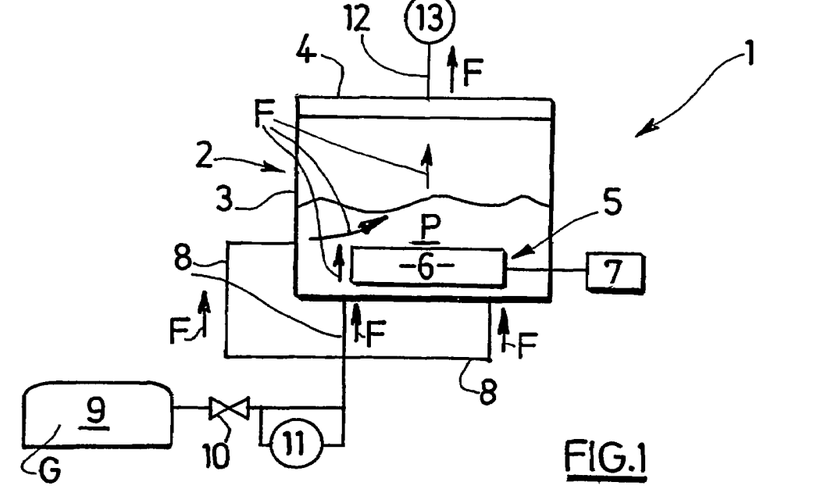
FIG. 1 is a schematic representation of a device implementing the kneading method of the invention.

FIG. 1 depicts schematically a kneading device 1, comprising a chamber 2 formed by a vessel 3 intended to contain the dough P and a removable lid 4, hermetically closing the said vessel 3, and providing its static sealing.

The said device 1 also comprises kneading means 5 comprising a rotor 6.

The rotation axis X of the rotor 6 can be either vertical or horizontal. The horizontalness being defined with respect to the floor on which the device 1 is resting, the vessel 3 being able to be fixed or tilting.

In the embodiments in FIGS. 2 to 5, the axis X of the rotor 6 is horizontal.

The rotor 6 is mounted for rotation in the vessel 3 and is actuated by a motor 7.

Supply means 8 open out in the chamber 2 and for example in the vessel 3 to allow the introduction of a gas G containing oxygen into the said vessel.

In one embodiment, the supply means 8 open out in the bottom part of the vessel 3, in the volume of the dough P, so that the gas G passes through the dough P.

These supply means 8 are for example nozzles or openings situated on the vessel 3 and connected to one or more reservoirs 9 of gas G. It is also possible to use, as gas supply means 8, means of supplying water to the said chamber 2.

A regulation valve 10 can also be provided for regulating the flow of gas G in the supply means 8.

It is thus possible to regulate the flow of gas G, in particular according to the nature and quantity of dough, the volume of the vessel and the required result.

One or more flow meters 11 can be used for measuring the flow of gas G introduced by the supply means 8 into the chamber 2.

The device 1 also comprises one or more pipes 12 for discharging the atmosphere present in the chamber 2. These pipes 12 open out in the chamber 2 at a distance from the dough P. They can be situated on the lid 4 or on the top part of the vessel 3, above the dough P.

These discharge pipes 12 are connected to at least one vacuum pump 13, which provides a partial vacuum in the chamber 2. The atmosphere in the chamber is thus under negative pressure with respect to the atmospheric pressure outside the chamber and with respect to the pressure in the supply means 8.

Pressure measurement means, such as pressure gauges, can be used for measuring the pressures in the supply means 8 and in the chamber 2.

The functioning of the vacuum pump or pumps 13 is adjusted so that no overpressure with respect to atmospheric pressure is applied in the chamber 2.

Thus the gas G is introduced into the chamber 2 through the supply means 8 and is then sucked into the discharge pipes 12 by the vacuum pump or pumps 13. A circulation of gas is thus caused in the chamber 2. This circulation is represented by the arrows F in the figures.

The gas supply means 8 and the discharge pipes 12 can be disposed on substantially opposite parts of the chamber 2 in order to help the gas G to pass through the dough P.

The pressure in the chamber 2 is such that it is lower than the pressure in the supply means 8 and/or the reservoir 9.

A pressure difference is thus created in the chamber 2 and the reservoir 9 of gas G, assisting the introduction of the gas G into the chamber 2.

The pressure difference can be accentuated by increasing the gas pressure in the reservoir 9 and/or in the supply pipes 8.

Particular embodiments of the device 1 and of the supply means 8 are now described in detail.

Figure 2:
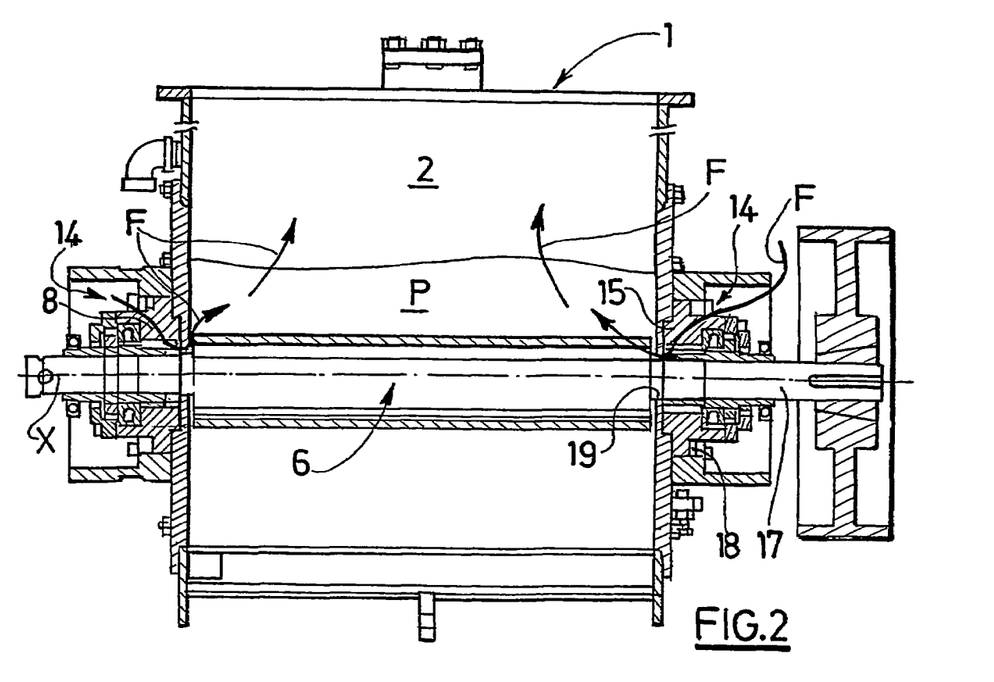
FIG. 2 is a view in axial section of a first embodiment of the device in FIG. 1, said device comprising a vessel and a rotor rotatably fixed on the vessel by two sealed roller bearings.
Figure 3:
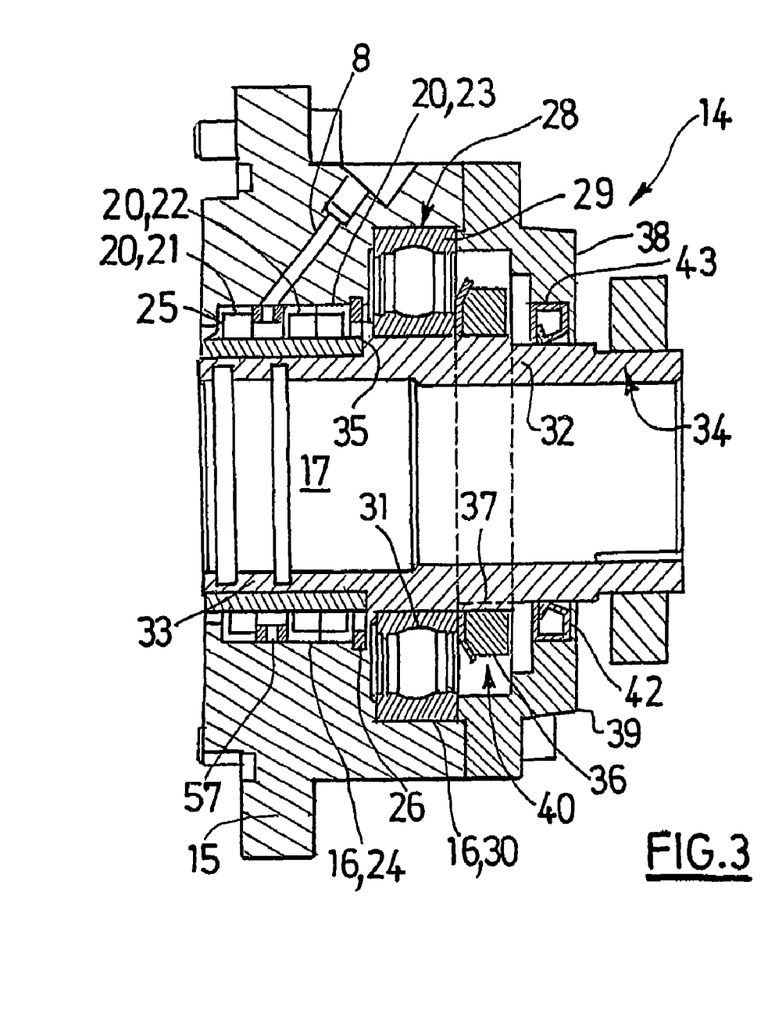
FIG. 3 is an enlarged view of the sealing means of the sealed bearings of the device in FIG. 2.
Figure 4:
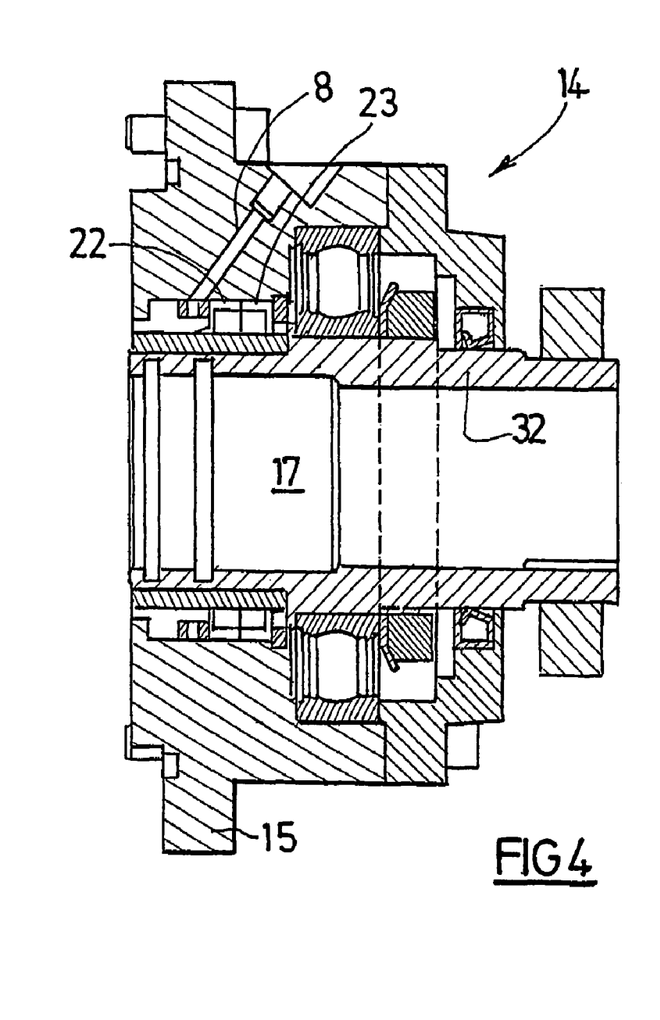
FIG. 4 is a variant of the sealing means depicted in FIG. 3.

In a first embodiment, with reference to FIGS. 2 to 4, the axis X of the rotor 6 is horizontal and the fixing and sealed guidance of the rotor 6 with respect to the said vessel 3 are achieved by means of bearings 14.

One of the bearings 14 is now described in detail, assuming the two bearings to be identical.

The bearing 14 comprises a bearing body 15 which has a through central recess 16 called a seat, having symmetry of revolution, and in which an end part 17 of the rotor 6 is inserted.

The bearing body 15 is fixed to a side wall of the vessel 3 on the external side, by means of removable fixing means 18 such as screws regularly distributed over the circumference of the bearing body 15.

The bearing body 15 is fixed in line with an opening 19 formed in the said side wall of the vessel 3, so that the axis of revolution of the seat 16 coincides with the rotation axis X of the rotor 6.

The bearing 14 is designed to provide a total seal of the inside of the vessel 3 with respect to the ambient atmosphere outside it.

To this end, the bearing 14 comprises dynamic sealing means 20 comprising a plurality of lip joints 21, 22, 23 mounted in series and fitted in a part of the seat 16 called a housing 24, adjacent to the opening 19 formed in the side wall of the vessel 3.

In the embodiment illustrated in FIG. 3, three lip joints 21, 22, 23 are provided, between a shoulder 25 of the housing 24 and an internal circlip 26 inserted in a groove formed in the housing 24.

The joints 21, 22, 23 are arranged both to provide the dynamic seal for the vessel 3 and to maintain it under pressure, the pressure inside the vessel being able to be lower than atmospheric pressure, for example 50 millibars, whilst the speed of rotation of the rotor in operation is generally between 10 revolutions per minute and 250 revolutions per minute.

To this end, at least one 21 of the joints, for example the one closest to the vessel 3, is oriented so that its lip is turned towards the inside of the vessel 3, whilst at least one 23 of the others is oriented so that its lip is turned towards the outside of the vessel.

Means 8 of supplying gas G to the vessel 3 are situated at the sealing means 20 of the said bearing 14.

To this end a bore is provided in the bearing body 15 in order to introduce the gas G.

This bore opens out on the one hand in the housing 24 of the sealing means 20 and on the other hand outside the bearing, on a part of the external surface of the bearing which is not in contact with another piece.

In the first variant in FIG. 3, the lips of the joints 21, 22 cooperate with the end part 17 of the jacket 32 turned towards the vessel 3, the two joints 21, 22 being oriented so that their lip is turned towards the vessel 3, whilst the other joint 23 is oriented so that its lip is turned in the opposite direction.

In this variant, the means 8 of supplying the gas open out in the housing 24, between the juxtaposed joints 21, 22.

The difference in pressure between the chamber 2 and the supply means 8 thus assist the raising of the lip of the joint 21 and the passage of the gas G to the chamber.

In the second variant in FIG. 4, only two juxtaposed joints 22, 23 are used, the two joints 22, 23 being oriented so that their lip is turned respectively towards the vessel 3 and in the opposite direction.

The gas supply means 8 then open out in the housing 24 between the vessel 3 and the said juxtaposed joints 22, 23.

These supply means 8 can be disposed on the two bearings 14 of the rotor, or on one of the two. It is also possible to envisage the production of one or more bores in a bearing 14 for introducing the gas G.

The gas is thus introduced as close as possible to the dough, directly on the rotor.

One embodiment of the structure of a bearing 14 is now described in detail with reference to FIG. 3.

In order to ensure rigid holding of the joints 21, 22, 23 in their housing 24 between the shoulder 25 and the circlip 26, at least one spacer 27 can be inserted between two successive joints 21, 22.

In addition, in order to provide the rotational guidance of the rotor 6, the bearing 14 comprises at least one roller bearing 28 interposed between the bearing body 15 and the end part 17 of the rotor 6.

The bearing 28 comprises a fixed external ring 29, associated with the bearing body 15 whilst for example being fitted in a bore 30 of the seat 16, a movable internal ring 31, and bodies rolling on each other, such as balls, needles or cylindrical or conical rollers.

The lip joints 21, 22, 23 and the bearing 28 are not in direct contact with the end part 17 of the rotor 6.

This is because the bearing 14 comprises an intermediate piece 32 of revolution, substantially cylindrical and hollow, called a jacket, fitted on the end part 17 of the rotor 3 and interposed between the said part and the bearing body 15.

The jacket 32 has a first end part 33 turned towards the inside and inserted in the seat 16 of the bearing body 15, and a second opposite end part 34, projecting from the seat 16 towards the outside.

The roller bearing 28 is interposed between the seat 16 of the bearing body 15 and the jacket 32, its inner race 31 being fitted on the jacket 32, and mounted clamped between a projecting shoulder 35 on the jacket 32 and a nut 36 screwed on the threaded part 37 of the jacket 32.

In addition, the lip joints 21, 22, 23 are interposed between the bearing body 15 and the jacket 32, their lips being in contact with the first end part 33 of the jacket 32.

In addition, in order on the one hand to provide the clamping of the outlet race 29 of the bearing 28 and on the other hand to ensure a complementary seal on the bearing 14, the latter comprises a cover 38 associated with the bearing body 15.

To this end the cover 38 comprises a cover body 39 in the form of a part of revolution having a central recess 40 for passage of the end part 17 of the rotor 6 and of the second end part 34 of the jacket 32 fitted thereon.

The cover 38 also comprises removable means 41 of fixing the cover body 39 to the bearing body 15, on the opposite side to the vessel 3, that is to say on the side turned towards the outside.

These fixing means 41 are for example in the form of a plurality of screws regularly distributed over the circumference of the cover body 38.

In addition, the cover comprises a lip joint 42 interposed between the cover body 39 and the jacket 32.

The lip joint 42 is for example fitted in a housing 43 provided in the central recess 40 of the cover body 39, its lip being in contact with the second end part 34 of the jacket 32.

In addition, the jacket 32 has an end 43 projecting from the cover 38 towards the outside.

In order to connect together, at least with respect to rotation, the jacket 32 and the end part 17 of the rotor 6, the bearing comprises an annular clamping collar 44 enclosing the end 43 of the jacket 32, this collar forming a means for the removable fixing of the jacket 32 to the rotor 6.

Figure 5:
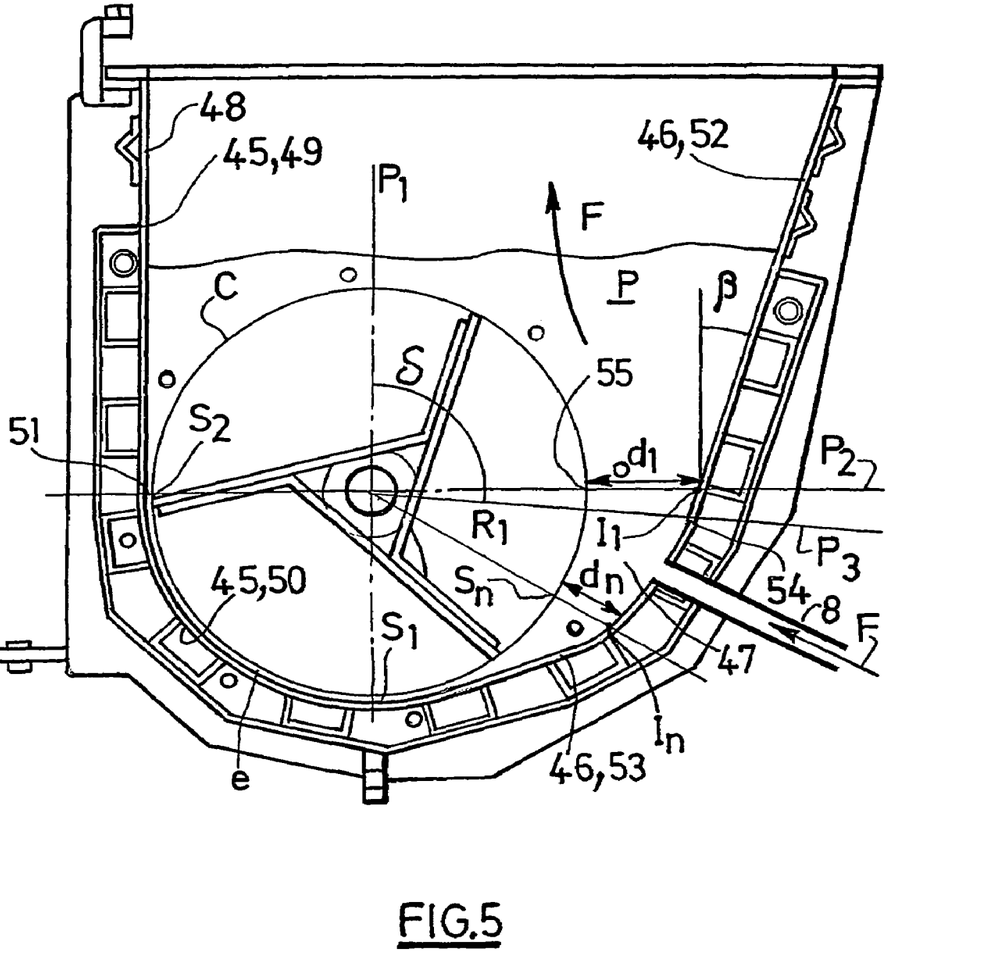
FIG. 5 is a view in axial section of a second embodiment of the device in FIG. 1.

In a second embodiment, with reference to FIG. 5, the device is such that the axis X of the rotor 6 is horizontal and the vessel 3 is asymmetric with respect to a vertical plane P1 passing through the rotation axis X of the rotor.

The vessel comprises a first substantially vertical side wall 45 and a second side wall 46 inclined by a given angle to the vertical.

The curved vessel bottom connects the first wall 45 to the second side wall 46, so that the vessel 3 comprises, on the same side as the second side wall 46, a space 47 opening out towards the top in the form of a crescent.

This space 47 is situated between the second side wall 46 and the path followed by the free end of the rotor 6 blades. This path is represented by the curve C in FIG. 5.

The gas supply means 8 open out in the said space 47, outside the passage area of the rotor 6 blades, and are thus easily accessible.

A particular arrangement of the walls 45, 46 of the vessel 3 is described below.

The internal face 48 of the first side wall 45 comprises a vertical rectilinear portion 49 and a curved portion 50, connected at a junction 51. The junction 51 belongs substantially to a horizontal plane P2 passing through the axis X of the rotor 6. Thus the path C of the blades is substantially tangent to the internal face 48, in fact separated by a space e, substantially from the junction 51 over approximately ¼ of a turn as far as the bottom vertex S1 of the path C. The circular path C matching the shape of the internal face 48, the portion 49 is tangent to the vertex S2 of the path C.

The internal face 48 of the second side wall 46 comprises a rectilinear portion 52 and a curved portion 53, connected at a junction 54.

Along the second side wall 46, the distance between the tangent to the path C at the vertex $S_n$ and the intersection $I_n$ between the second wall 46 and the radius R1 of the path passing through the intersection $I_n$ is defined as $d_n$.

On the same side as the second side wall 46:
the portion 52 is inclined by an angle β of around 10° to the vertical;
the intersection $I_n$ is separated from the vertex $S_n$ by the distance $d_n$.

Thus the plane P2 intersects the second side wall 46 at the intersection I1, the vertex Sn is marked with the reference 55, the intersection I1 and the vertex 55 are spaced apart by the distance d1.

An angle δ is defined between on the one hand the vertical plane P1 passing through the axis of the rotor 6 and on the other hand a plane P3 passing through the axis of the rotor 6 and the junction 54 between the portion 52 and the portion 53. The best results obtained correspond to a value of δ of around 100°.

It is possible to use a device comprising a vessel 3 as described in the second embodiment and where the fixing and sealed guidance of the rotor 6 with respect to the said vessel 3 are achieved by means of bearings 14 described in the first embodiment.

The supply means 8 described in these embodiments can then be used in combination or alone.

The dough kneading method is now described.

During a first step, the lid 4 is opened so as to allow the introduction of the ingredients of the dough P into the chamber 2.

These ingredients comprise in particular flour, water and other elements used in baking. Amongst the latter, ascorbic acid can be used as an improver. However, good results are obtained with the method of the invention without using ascorbic acid.

The ingredients are then introduced into the chamber and the lid 4 is closed again hermetically in order to ensure that the chamber 2 is sealed.

The rotor 6 is then started up so as to stir the ingredients of the dough P. The functioning of the rotor corresponds to the kneading phase.

The method also comprises:
a negative-pressure phase during which a pressure below atmospheric pressure is applied in the chamber 2,
one or more phases of introducing the gas G containing oxygen during which the gas G is introduced into the chamber 2.

The negative-pressure and introduction phases help to create a circulation of gas in the chamber 2.

The negative-pressure phase lasts substantially throughout the kneading phase.

It can begin just a short time before or after the start of the kneading phase and end just a short time before or after the end of the kneading phase.

Several introduction phases can be applied during the kneading phase. The intervals of time between these phases and the duration of each of these phases can be variable.

Each of these introduction phases takes place substantially during the kneading phase. A phase can however begin or end just a little time before or after the start or end of the kneading phase.

Thus at least part of each introduction phase and the kneading phase are simultaneous.

A kneading phase lasting from a few minutes to several tens of minutes, each phase of introducing the gas G can last from around a few seconds to several tens of minutes. Thus a phase can last substantially throughout the kneading only for a short time during the kneading.

The introduction of the gas G for a period less than the kneading time is implemented to the detriment of oxygenation but does however assist the reduction of the structure of the alveoli in the soft part of the bread obtained.

During the introduction phase, the rate of introduction of the gas G can be varied according to requirements. This rate can also vary from one phase to another during the same kneading phase.

During the negative-pressure phase, the negative pressure in the chamber 2 is achieved by means of vacuum pumps 13 which function as long as the pressure in the chamber 2 is to be reduced.

In particular, in the absence of introduction of the gas G, the functioning of the vacuum pumps 13 can be suspended if the seal on the chamber is sufficient for a negative pressure to be maintained in the latter.

During the negative-pressure phase, the absolute pressure applied in the said chamber 2 can be between 0.02 bar and 0.98 bar. It is possible to vary this pressure during the negative-pressure phase.

The number and duration of the gas introduction phases, as well as the duration of the negative-pressure phase and the value of the pressure applied to the chamber during this phase, depend in particular on the nature and quantity of the dough P, the volume of the vessel and the result required.

During the kneading, the speed of rotation of the rotor 6 can be varied in order to adapt it to the product required. The duration of the kneading phase is then in general longer and longer as the speed of rotation of the rotor 6 is reduced.

At the end of the kneading phase, the functioning of the rotor 6 is stopped and, when the pressure in the chamber 2 is equal to the atmospheric pressure, the lid 4 is lifted off and the dough can be removed.

In a variant of the method, during the phase of introduction of the gas G into the chamber 2, the gas G is introduced into the chamber 2 in the volume of the dough P, so that the circulation of gas passes through the dough P.

In another variant, the gas G is introduced into the said chamber using the device for supplying water to the said chamber 2.

The gas containing oxygen can be air or any other gas containing oxygen suitable for producing the food dough.

Finally, control means can be provided for regulating the various parameters of the method such as the pressure in the chamber and/or in the supply pipes, the flow of gas G, the speed of rotation of the rotor and the duration of the various phases.

Examples of durations of the various phases are described below with reference to FIGS. 6 to 8.

Figure 6:
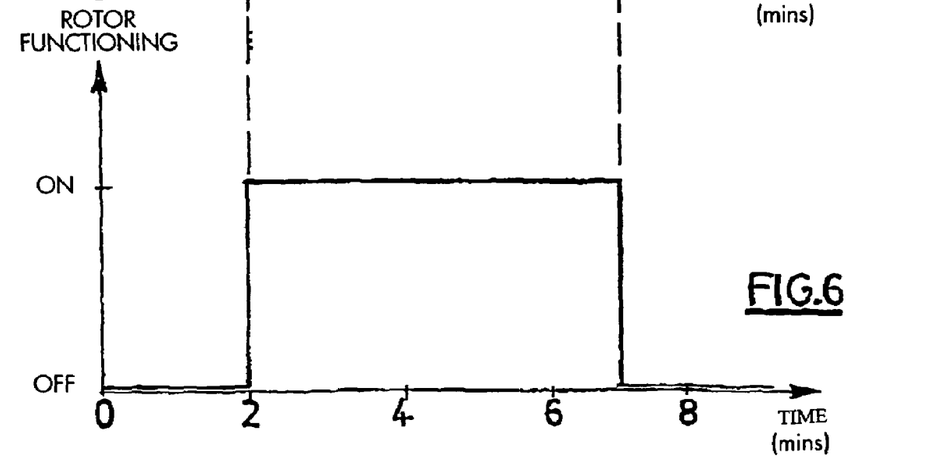
FIG. 6 is a diagram representing the starting of the rotor as a function of time during the kneading phase.

FIG. 6 depicts the functioning of the rotor as a function of time, the curve obtained representing the duration of the kneading phase.

Figure 7:
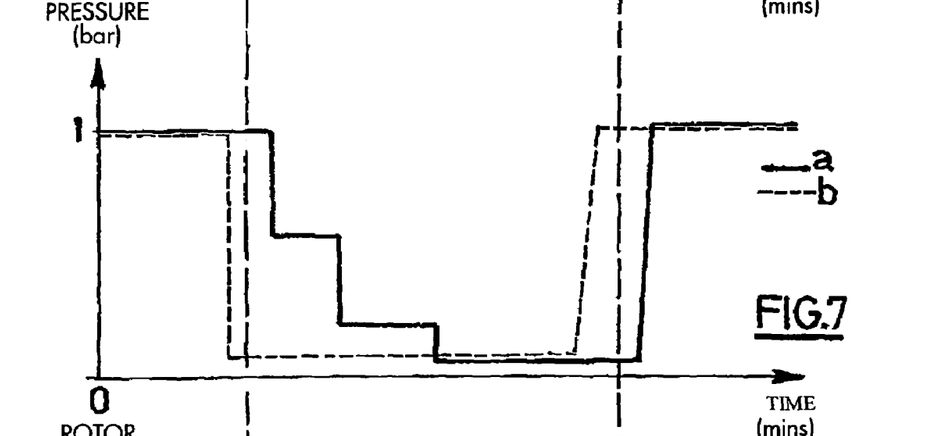
FIG. 7 is a diagram representing possible profiles of the negative pressure in the chamber as a function of time.

FIG. 7 shows the pressure in the chamber 2 as a function of time. Thus curves a, b represent examples of change in the pressure during the negative-pressure phase.

Curve a (in a continuous line) corresponds to a phase during which the pressure in the chamber 2 is progressively reduced. The reduction in the pressure begins just a short time after the start of the kneading phase and stops just a short time after the end of the kneading phase.

Curve b (in a broken line) corresponds to a rapid reduction in the pressure just a little time before the start of the kneading phase, the pressure increasing once again just a little time before the end of the kneading.

Figure 8:
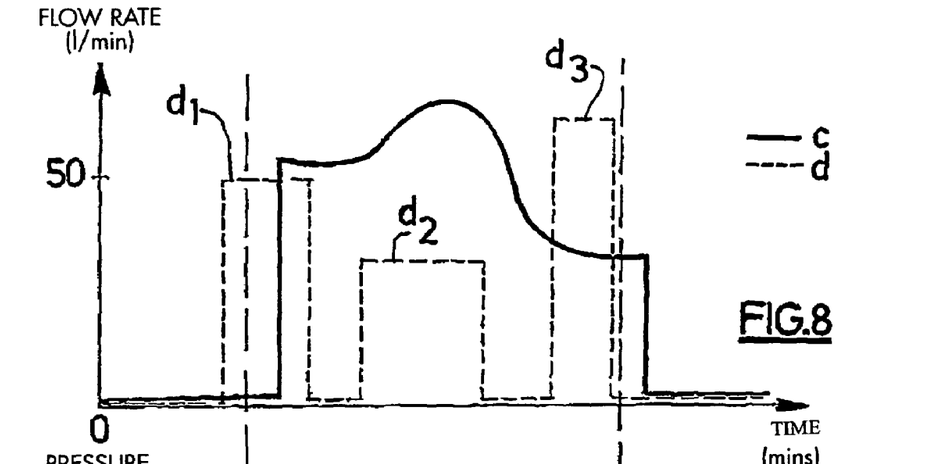
FIG. 8 is a diagram depicting possible profiles of the gas flow as a function of time.

FIG. 8 depicts the flow of gas G introduced into the chamber 2 as a function of time. Each curve c, d represents a phase of introducing the gas G.

Curve c (in a continuous line) corresponds to a single introduction phase during which the introduction of the gas commences just a little time after the start of the kneading phase and ends just a little time after the end of the kneading phase. During this phase, the gas flow varies as a function of time. Such a phase can for example be combined with the negative-pressure phase represented by curve a in FIG. 7.

Curve d (broken line) consists of three curves d1, d2 and d3 corresponding to three introduction phases. During each of these phases, the gas is introduced at a constant rate, the rate varying from one phase to another. The durations and the intervals between these phases are variable.

All these three phases, each of the phases, or all combinations between two of these phases can be combined with the negative-pressure phase represented by curve b in FIG. 7.

An example of an implementation of the method is described below.

In this example, the device 1 described in the first embodiment is used. The volume of the vessel 3 is 400 liters.

The gas employed is air and the latter is introduced through the two bearings 14 of the rotor.

For 260 kg of bread dough, the following conditions are used for obtaining a good-quality bread dough:

duration of the kneading phase: 6 minutes 30 seconds;

at each bearing 14: introduction of air at a flow rate of 50 liters per minute and a pressure of 3 bar in the supply means 8;

pressure in the chamber 2: −0.8 bar, and the absolute pressure in the chamber 2 is then 0.2 bar.

The phases of negative pressure and introduction of the gas G last throughout the kneading phase, the chamber being continuously maintained under negative pressure.

The method according to the invention can be applied to any kneading device whose chamber can be put under partial vacuum. It then suffices to add means of supplying gas to the said chamber.

What is claimed is:

1. A method of kneading dough for making bread or similar products, the method comprising the steps of:
   introducing ingredients of the dough into a chamber;
   kneading the ingredients together during a kneading phase;
   applying a negative pressure during a negative-pressure phase in the chamber, atmosphere present in the chamber being sucked above the ingredients; and
   introducing gas which contains oxygen at flow rate of approximately 50 liters per minute or less during at least one gas introduction phase into the chamber near a bottom portion thereof such that the gas passes through the ingredients;
   wherein at least a portion of the negative-pressure phase is substantially simultaneous with the kneading phase, the at least one gas introduction phase is substantially simultaneous with the kneading phase, and at least a portion of each gas introduction phase is simultaneous with the negative-pressure phase.

2. A method according to claim 1, characterised in that the portion of the negative-pressure phase begins near an end of the kneading phase.

3. A method according to claim 1, characterised in that the at least one gas introduction phase begins near the start or the end of the kneading phase.

4. A method according to claim 1, characterised in that the at least one gas introduction phase finishes near the start or end of the kneading phase.

5. A method according to claim 1, characterised in that the method comprises only one gas introduction phase, which lasts substantially throughout the kneading phase.

6. A method according to claim 1, characterised in that the method comprises several gas introduction phases, the intervals of time between the gas introduction phases and the duration of each of the gas introduction phases being variable.

7. A method according to claim 1, characterised in that the at least one gas introduction phase lasts from one second to sixty minutes.

8. A method according to claim 1, characterised in that, during the at least one gas introduction phase, the flow rate of the gas can be varied.

9. A method according to claim 1, characterised in that, during the negative-pressure phase, an absolute pressure in the chamber of between 0.02 bar and 0.98 bar is applied.

10. A method according to claim 1, characterised in that the gas is introduced into the chamber as the ingredients are kneaded together.

11. A method according to claim 1, further comprising the step of oxidizing at least one of the ingredients of the dough during the at least one gas introduction phase.

12. A method of kneading dough for making bread or similar products, the method comprising the steps of:
   introducing ingredients of the dough into a chamber;
   providing an opening into the chamber;
   providing a rotor through the opening, the rotor adapted for kneading dough;
   providing at least one bearing for the rotor adjacent to the opening;
   kneading the ingredients together during a kneading phase with the rotor;
   applying a negative pressure during a negative-pressure phase in the chamber, atmosphere present in the chamber being sucked above the ingredients;
   providing a gas supply in the at least one bearing for the rotor; and
   introducing gas which contains oxygen during at least one gas introduction phase into the chamber near the opening such that the gas passes through the ingredients;
   wherein a portion of the negative-pressure phase is substantially simultaneous with the kneading phase, and the at least one gas introduction phase is substantially simultaneous with the kneading phase.

13. A method of kneading dough for making bread or similar products, the method comprising the steps of:
   introducing ingredients of the dough into an asymmetric chamber;
   kneading the ingredients together during a kneading phase;
   applying a negative pressure during a negative-pressure phase in the asymmetric chamber, atmosphere present in the chamber being sucked above the ingredients; and
   introducing gas which contains oxygen during at least one gas introduction phase into the asymmetric chamber near a bottom portion thereof such that the gas passes though the ingredients;
   wherein a portion of the negative-pressure phase is substantially simultaneous with the kneading phase, and the at least one gas introduction phase is substantially simultaneous with the kneading phase.

* * * * *